R. W. EATON.
Spoke-Tenon Auger.

No. 218,721. Patented Aug. 19, 1879.

Witnesses
Frank A. Brooks
Geo. W. Strong

Inventor
Robert W. Eaton
By Dewey & Co
Attys

UNITED STATES PATENT OFFICE.

ROBERT W. EATON, OF WATSONVILLE, CALIFORNIA.

IMPROVEMENT IN SPOKE-TENON AUGERS.

Specification forming part of Letters Patent No. 218,721, dated August 19, 1879; application filed June 2, 1879.

*To all whom it may concern:*

Be it known that I, ROBERT W. EATON, of Watsonville, county of Santa Cruz and State of California, have invented an Improvement in Spoke-Tenon Augers; and I hereby declare the following to be a full, clear, and exact description thereof.

My invention relates to certain improvements in turning augers; and it consists, first, in a novel construction of the cutter-head, and in a means for adjusting and making it center with the mandrel, all of which will be more fully described by reference to the accompanying drawings, in which—

Figure 1:
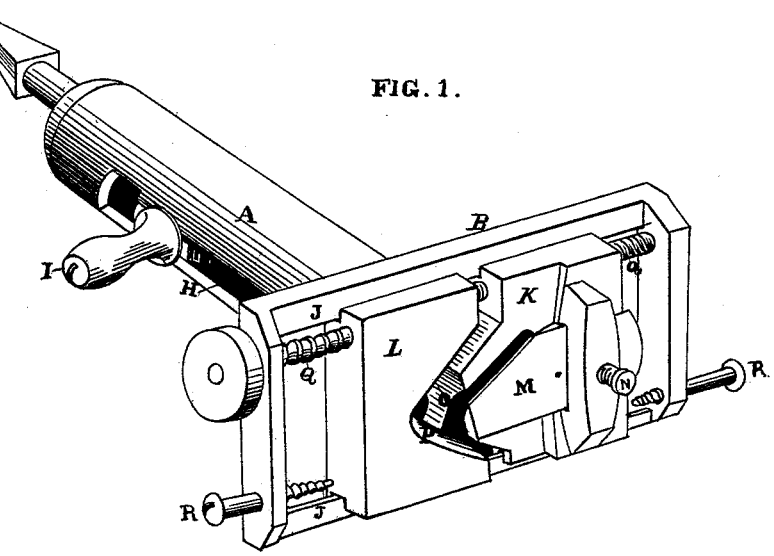
Figure 2:
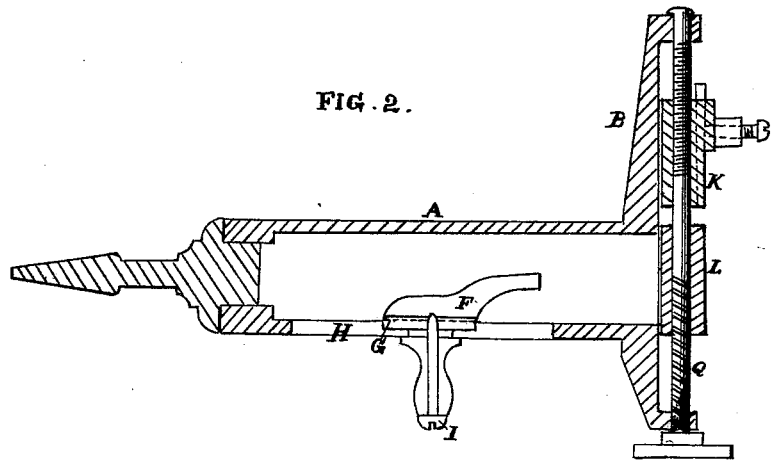
Figure 3:
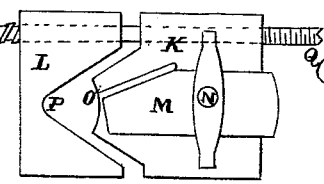

Figure 1 is a view of my cutter-head fitted to be used with a bit-stock. Fig. 2 is a longitudinal section of the same. Fig. 3 is an elevation of the blocks.

A is the mandrel, or that portion of it which carries the cutter-head B, and this part A is fitted to be secured to the other portion of the mandrel, as shown in a former patent issued to me.

The gage for the length of the tenon consists of a pin or bolt, F, which is cut as shown in Fig. 2, and is provided with shoulders G, which steady it and hold it firm in the slot H, which is made in the side of the mandrel, as shown.

A screw with a milled or other suitable head, I, serves to clamp this bolt or gage at any desired point. The rear or lower end of the slot H is enlarged, and the peculiar shape of the gage, with its rear portion inclined or cut away, allows it to be easily removed by loosening the screw.

My cutter-head B is formed with guides J upon each side, and the blocks K and L slide upon these guides, so as to move to or from each other. One of these blocks, K, carries the knife M, which is secured to it by a set-screw, N, and the face or portion of the block which lies toward the block L is beveled off or formed with a double incline, making a sort of V-shaped projection, O. The other block, L, has a similarly-shaped notch, P, formed in its opposite face, so that the tenon entering between these two blocks will have three points of support—namely, the surface O of the block K, which rests directly against the tenon, and the two inclined sides of the notch P in the block L.

As the sizes of tenons to be cut vary, it will be seen that the double points of support formed by the notch P must be advanced or moved back more than the single face O, in order to keep the tenon in the center of the mandrel A while being bored. This is effected by a peculiarly-constructed right and left handed feed-screw, Q. This double reverse-threaded screw is cut upon a single shaft, which extends through the two blocks K and L, and turns in bearings at each end of the cutter-head, as shown. By turning this shaft the different sizes of tenons can be made and still be true to the center of the mandrel A.

That portion of the screw which passes through the block K has threads of a certain pitch, which advance or withdraw the block when the screw is turned. This thread extends to near the center, and that portion of the screw which passes through the block L has a much more rapid pitch in the opposite direction, so as to move this block forward faster than the other. The pitch of this screw with relation to the one which moves the block K is determined by the angles of the notch P, so that this block is set forward faster than the block K. This device insures a perfect centering of the tenon with the mandrel A, whatever may be its size.

When the blocks K and L are moved to the proper position they are steadied by set-screws R, which are turned up until they touch the backs of the blocks, where they steady them while a cut is being made.

By this construction I am enabled to maintain any tenon, whatever may be its size, in the center of the mandrel while being cut, so that when the mandrel is turned its axis will correspond with that of the tenon. It will thus be seen that the manner of clamping the spoke or other article has no bearing upon this device, because it is frequently necessary to form a tenon the axis of which is not in line with the axis of the spoke, as in forming tenons upon spokes for dished wheels.

Having thus described my invention, what

I claim as new, and desire to secure by Letters Patent, is—

1. The cutter-head having the blocks K and L moving on the guides J, in combination with the right-and-left adjusting-screw Q, by which they are caused to approach each other or recede, substantially as and for the purpose herein described.

2. The cutter-head B, having the blocks K and L moving on the guides J, one of said blocks being formed with the V-shaped groove or notch P, while the other has a corresponding projection, O, in combination with the right-and-left adjusting-screw Q, with its threads of different pitch, substantially as herein described.

In witness whereof I have hereunto set my hand.

ROBERT WILLIAM EATON.

Witnesses:
CHR. J. WIEHMANN,
ERNEST S. S. ROOT.